(No Model.) 2 Sheets—Sheet 1.

G. W. CAMPBELL.
FRUIT PITTING MACHINE.

No. 414,971. Patented Nov. 12, 1889.

Witnesses,
Geo. H. Strong.
J. H. Nourse.

Inventor,
Guy W. Campbell
By Dewey & Co.
Attys (No Model.) 2 Sheets—Sheet 2.

G. W. CAMPBELL.
FRUIT PITTING MACHINE.

No. 414,971. Patented Nov. 12, 1889.

Witnesses,
Geo. H. Strong
J. H. Horse

Inventor,
Guy W. Campbell
By Dewey & Co.
Attys

UNITED STATES PATENT OFFICE.

GUY WARD CAMPBELL, OF SAN JOSÉ, ASSIGNOR OF ONE-HALF TO JESSE WOOD, OF CHICO, CALIFORNIA.

FRUIT-PITTING MACHINE.

SPECIFICATION forming part of Letters Patent No. 414,971, dated November 12, 1889.

Application filed June 6, 1889. Serial No. 313,375. (No model.)

*To all whom it may concern:*

Be it known that I, GUY WARD CAMPBELL, of San José, Santa Clara county, State of California, have invented an Improvement in Fruit-Pitting Machines; and I hereby declare the following to be a full, clear, and exact description of the same.

My invention relates to that class of mechanism for pitting or stoning fruit in which a reciprocating winged punch is adapted to be forced down upon the fruit so as to divide its flesh and remove its pit, the fruit being held in a suitable socketed bed below; and my invention consists in a novel hinged and tilting bed for the fruit, whereby the divided fruit is discharged as the winged punch rises, the novel mechanism for operating said bed, the discharge-chute and connections for receiving and guiding the cut fruit, the novel underlying knife for cutting the bottom of the fruit, the novel removable connection of the operating-bar and the winged punch-stem, and other details of construction and arrangement, all of which I shall hereinafter fully describe, together with the objects of my several improvements.

Figure 1:
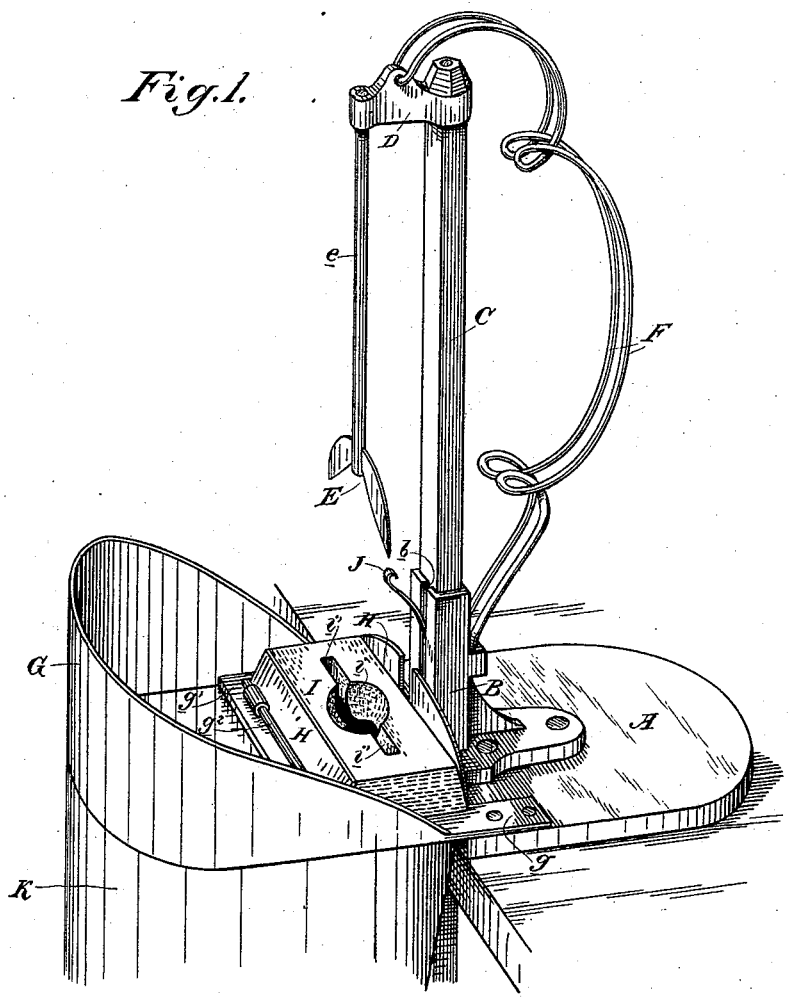
Figure 2:
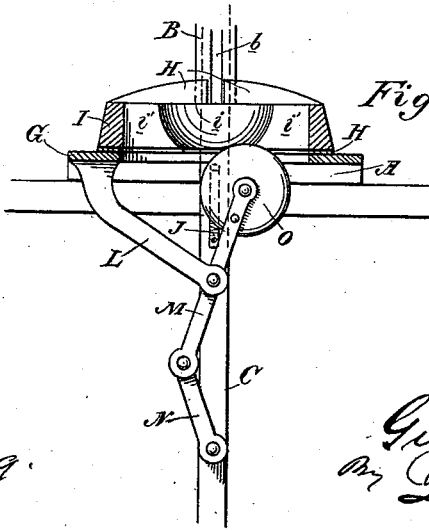
Figure 3:
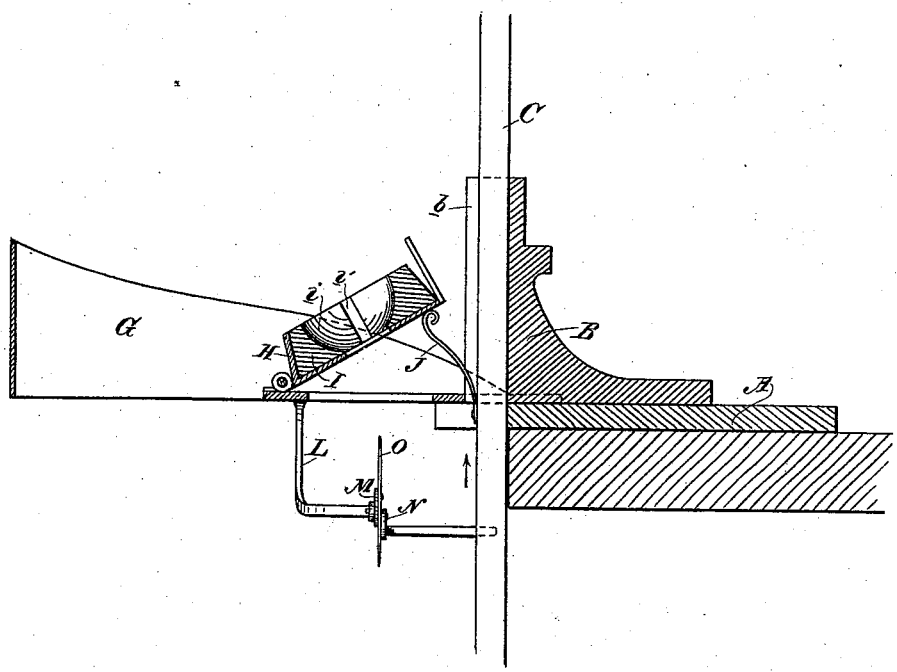

Referring to the accompanying drawings for a more complete explanation of my invention, Figure 1 is a perspective view of my machine. Fig. 2 is a longitudinal section of the holder and bed, showing the lower cutting-knife. Fig. 3 is a cross-section of holder and bed, showing them being tilted by the arm J on the operating-bar C.

A is the base of the machine, from the forward edge of which rises the socketed standard B, in which is fitted and adapted to slide the bar C, to the lower end of which a treadle may be supposed to be attached.

D is a cross-head, into which the upper end of the bar C, which is externally threaded, is screwed, and into the other end of this cross-head is screwed the upper threaded end of the stem $e$, the lower end of which carries the winged punch E. This winged punch is of the ordinary form, consisting of side blades fitted to the end of the punch, which projects slightly below the cutting-edges of the blades.

F is a spring by which the operating-bar C and the winged punch are raised again after being forced down by the treadle-connection below.

G is a flanged plate or casting, the ends $g$ of which are screwed down upon each side of the forward edge of the base A of the machine. This plate or casting G has an open bottom, and is provided with a cross-bar $g'$, to which is hinged, as shown at $g^2$, the holder H, for containing the bed or cushion-block I, which is made with a central socket $i$ and side slits $i'$, and the bottom of the holder H is perforated under the openings of the cushion-block. The inner edge of the holder is entirely free, and said holder, with its block, has a movement about its hinged center $g^2$. This movement is effected by means of a spring-arm J, which is secured to the vertically-movable operating-bar C and projects forwardly through a front slot $b$ in the standard B.

Fitted to the plate or casting G, and in communication with its open bottom, is the discharge-chute K. Secured to the plate or casting G below is a fixed arm or bracket L, in the end of which is pivoted a lever M, one end of which is connected by a link N with the vertically-moving operating-bar C. The other end of the lever M carries a cutting disk or knife O.

The operation of the machine is as follows: The fruit is placed in the socket $i$ of the cushion-block J, and the bar C is then moved down so that the winged punch E comes down upon the fruit, its side blades dividing said fruit and its central part punching the pit out, so that it drops through the open bottom into a suitable receptacle below. Upon this same downward movement of the bar C the spring-arm J slips by the inner edge of the cushion-block and holder, and when fully down past them springs outwardly again into the vertical plane of the inner edge of said holder. This same downward movement of the bar C causes the lever M to throw its knife O up under the fruit and cut it underneath as the wings or blades of the punch above cut it on the top and the sides, so that the fruit is entirely halved. The bar C being released, the spring F throws it up again, thereby removing the winged punch for another stroke, and this same movement of the bar carries up with it the spring-arm J, which, coming in contact with the inner or free edge of the cushion-block holder, tilts said holder and block forwardly upon the pivotal center $g^2$, thereby throwing the divided fruit from the socket $i$ into the flanged plate or casting G, through which it passes into the discharge-chute K and is received in a suitable receptacle below. Then a second fruit is placed in position and the operation repeated, and from this it will be seen that as each fruit is stoned and cut the divided flesh is automatically and positively discharged by the swinging or tilting of the holder and confined cushion-block.

A further point of novelty is to be observed in the connection between the tops of the operating-bar C and the stem $e$ of the winged punch. This connection is made by the independent cross-head D, into which the tops of the bar and the stem separately screw, so that when either is worn out or has to be removed and replaced or renewed it can be readily done without affecting the other.

Having thus described my invention, what I claim as new, and desire to secure by Letters Patent, is—

1. In a fruit-pitting machine, the hinged and tilting bed for the fruit, whereby it is discharged after being stoned, substantially as described.

2. In a fruit-pitting machine, and in combination with the punch for stoning the fruit, a bed in which the fruit is held, said bed being hinged, whereby it may be tilted to discharge the stoned fruit, substantially as described.

3. In a fruit-pitting machine, the combination of a reciprocating winged punch and connections for operating it, a hinged or swinging bed for holding the fruit to be acted upon by the winged punch, and a connection with the operating-connections of the winged punch whereby said bed is tilted to discharge the cut and stoned fruit, substantially as described.

4. In a fruit-pitting machine, the reciprocating winged punch and the movable bar for operating it, in combination with a hinged or swinging bed for the fruit and a spring-arm projecting from the operating-bar and adapted to come in contact with the bed, whereby it is tilted to discharge the fruit, substantially as described.

5. In a fruit-pitting machine, the reciprocating winged punch and the movable bar by which it is operated, in combination with the holder H, hinged at one edge, the cushion-block I, fitted in said holder, and the spring-arm on the moving bar for coming in contact with the bottom of the holder for tilting it and the cushion-block to discharge the fruit, substantially as described.

6. In a fruit-pitting machine, the base A, the standard B, the vertically-movable bar C, mounted in said standard, and the winged punch E, connected with the top of the bar, in combination with the perforated hinged holder H, the apertured and slitted cushion-block I, mounted in said holder, and the spring-arm J on the bar C, for tilting the holder, substantially as described.

7. In a fruit-pitting machine, the combination of the movable bar and the winged punch, the open-bottomed flanged casting or plate G, the perforated holder H, hinged in said casting or plate, the apertured and slitted cushion-block mounted in said holder, and the spring-arm J on the movable bar for tilting the holder and block, substantially as described.

8. In a fruit-pitting machine, and in combination with the movable bar and the winged punch connected therewith, the open-bottomed flanged plate or casting G, the discharge-chute communicating therewith, the holder H, hinged in said plate or casting, the cushion-block I in the holder, and the spring-arm J on the movable bar, for tilting said holder and block, whereby the fruit is discharged, substantially as described.

9. In a fruit-pitting machine, the apertured bed for holding the fruit, in combination with the knife under said bed for cutting the bottom of the fruit, substantially as described.

10. In a fruit-pitting machine, the apertured bed for holding the fruit and a reciprocating operating-bar, in combination with the winged punch carried by said bar for cutting the top and sides of the fruit and forcing the pit out and a knife under said bed and connected with the moving bar for cutting the fruit below, substantially as described.

11. In a fruit-pitting machine, the operating-bar C and the apertured bed in which the fruit is held, in combination with the underlying knife O, for cutting the bottom of the fruit, the pivoted lever by which said knife is carried, and the link connecting the lever with the operating-bar, substantially as described.

12. In a fruit-pitting machine, an apertured bed for holding the fruit and a reciprocating operating-bar C, in combination with the winged punch E, carried by said bar for cutting the top and sides of the fruit and forcing its stone out, the knife O, for cutting the bottom of the fruit, the pivoted lever M, carrying said knife, and the link N, connecting the lever M with the reciprocating bar, substantially as described.

13. A fruit-pitting machine comprising the base A, the flanged plate or casting G secured thereto, the discharge-spout from said plate or casting, the standard B, rising from the base, the reciprocating bar in said standard, the winged punch E, having the stem $e$, and the removable cross-head connecting the bar with the stem of the winged punch, the perforated hinged holder H in the plate or casting, the apertured and slitted cushion-block in the holder, the spring-arm J, carried by the reciprocating bar, the underlying knife O, the pivoted lever M, and link N, all arranged and adapted to operate substantially as described.

In witness whereof I have hereunto set my hand.

GUY WARD CAMPBELL.

Witnesses:
WM. M. LANDESS,
W. T. BAER.